Patented June 17, 1941

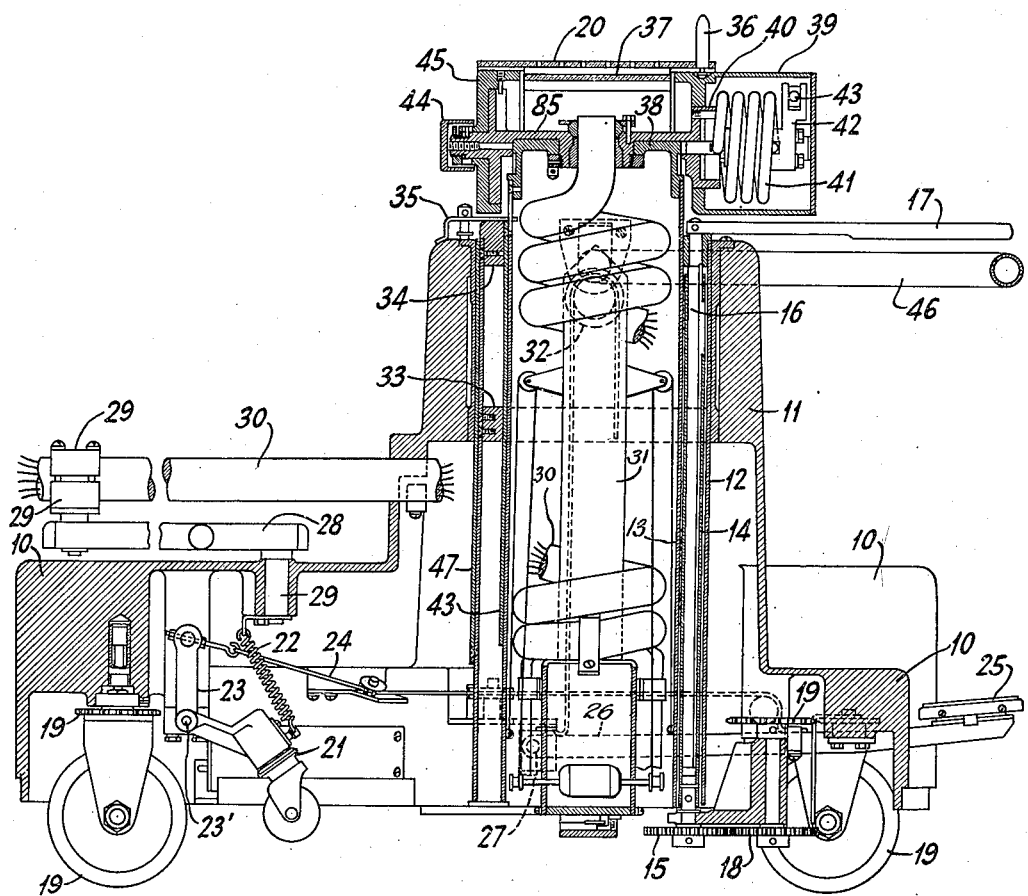

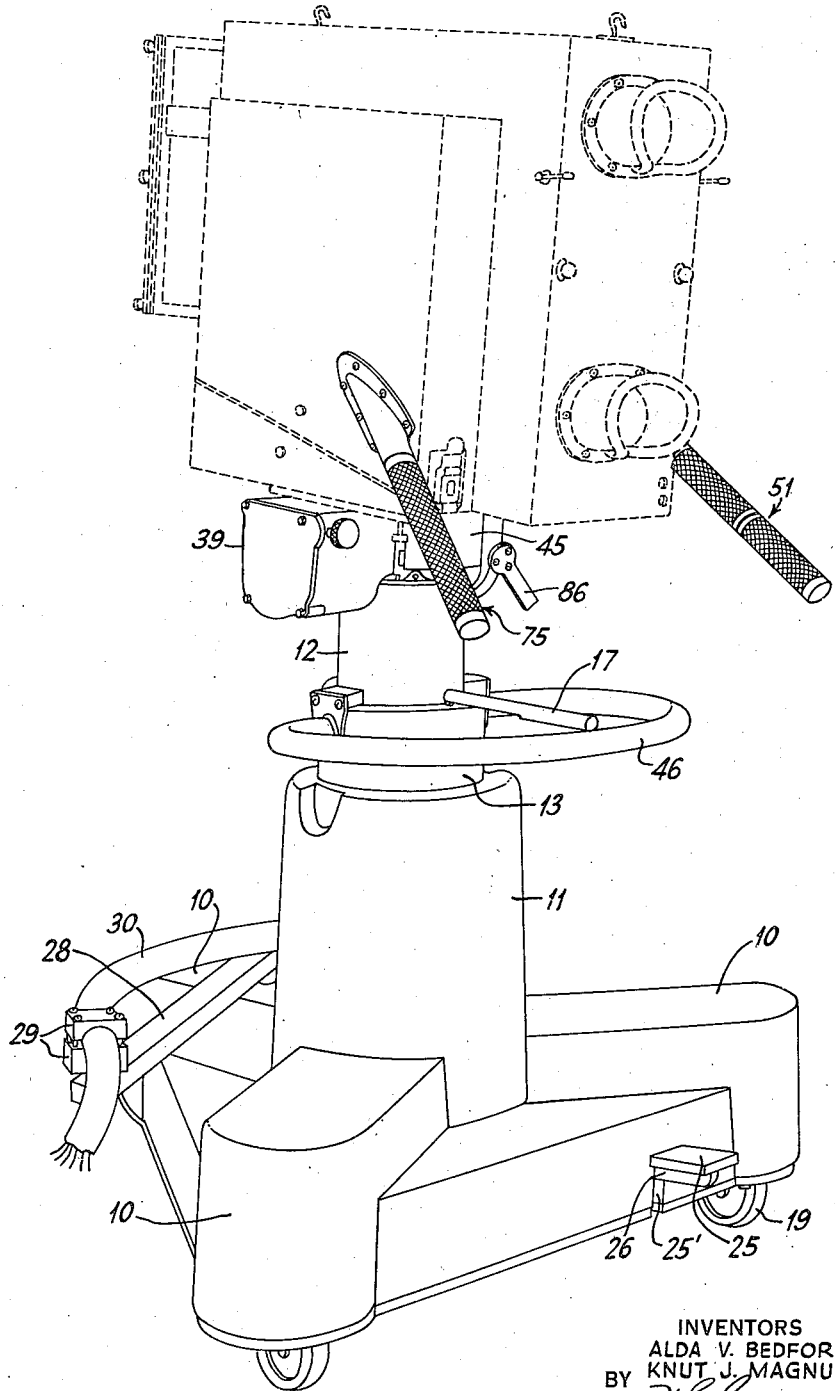

2,246,287

UNITED STATES PATENT OFFICE 2,246,287

CAMERA SUPPORTING PEDESTAL

Alda V. Bedford, Collingswood, and Knut J. Magnusson, Merchantville, N. J., assignors to Radio Corporation of America, a corporation of Delaware Original application November 5, 1936, Serial No. 109,390. Divided and this application September 30, 1937, Serial No. 166,477

1 Claim. (Cl. 248—183)

The present invention is a division of our application Serial No. 109,390 filed November 5, 1936 and relates to television camera structures and particularly to that portion of the camera which is known in the art as a television camera dolly and which is used to carry or support the camera equipment by which the optical image is converted into electrical signals which at receiving points produce an electro-optical representation of the subject at the transmission point.

It has long been established from the motion picture industry that for the purpose of changing from remote to close-up shots or vice versa or for the purpose of tilting or changing from a low viewing point of the subject to an elevated viewing point or for the purpose of obtaining panoramic views, it is desirable to provide ways and means by which the film taking equipment can be moved about from place to place in order to accomplish these ends in a most suitable and convenient manner.

However, many reasons present themselves for making such known forms of motion picture apparatus not satisfactory or suitable for television practice. Among the difficulties which present themselves in television practice are those which are due to the necessity of a great number of electric cables connected to the camera device. Also, apparatus of this nature must be entirely free as well as shielded from both electrical and audible disturbances which would otherwise spoil or ruin the resultant picture and/or sound transmission. In addition, compact apparatus is desirable in order to lend more flexibility to development trends since compactness of apparatus which includes all necessary control features permits full and complete control by a single operator.

The features of the camera equipment per se are described and claimed in a co-pending application filed by the present inventors on even date herewith. In the co-pending application, the relationship between the view finding and focussing arrangements, the internal cabinet construction and the camera per se, and other related features, have been described and claimed. The present invention is, however, directed more particularly to the manner by which the camera equipment may be moved about from place to place and set and adjusted to such positions as to provide for obtaining all desired types of views.

In general, the subject-matter of the present invention is directed to the apparatus and means for providing different elevations of the television camera equipment. It is also concerned with suitable arrangements to provide for the taking of panoramic views and tilting of the taken view to different angles. The camera equipment itself is heavy and suitable ways and means are provided to compensate for the shifting of the camera weight due to tilting. In motion picture practice, it has been customary to provide a counter-balancing boom to balance the weight of the tilted camera but with television camera equipment which can be controlled by a single operator such type construction is not desirable. Accordingly, this invention provides resilient or mechanical means to compensate and equalize any shifting of the camera weight with respect to the axis of support so that the camera shall at all times be perfectly balanced irrespective of its position of tilt.

At the same time, in order to prevent too rapidly shifting scenes, provision must be made by which to insure only relatively slow movement of the television camera with respect to the viewed object so that the resultant picture transmitted will not appear "jumpy." Accordingly, ways and means are disclosed in the present application by which for slow movements of the camera the apparatus is capable of being turned easily, whereas excessive friction results in the event of attempted rapid movement and substantially prevents such rapid movement.

The provision of the foregoing features are all included among the several other objects and advantages of the invention, but other objects of course will become apparent and at once suggest themselves to those skilled in the art to which the invention is directed by reading the following specification and claim in connection with the several figures of the accompanying drawings wherein:

Fig. 1 is an elevation of the pedestal as seen on a cutting plane containing a major axis, and Fig. 2 is a perspective view.

The general shape of the pedestal may best be seen from the perspective shown in Fig. 2. In general, the pedestal is comprised of three radially extended arm members spaced 120° apart from each other and each extending radially from a vertically positioned housing containing a tubular shaped receptacle, the latter being used to accommodate the elevating telescoping mechanism. The arm members referred to are located at the base of the pedestal and are joined to each other by three plane faced triangularly shaped metallic members. Joined to each of the radial arm members is a supporting wheel containing a sprocket, the function of which will be explained hereinafter. The radial arm members are preferably hollowed except at their extremity where the sprocket wheel is accommodated, the hollow feature being used in order to make the arm form both a housing and support member for the apparatus for operating the steering means and for the elevating means which supports the object to be accommodated by the pedestal. Joined to the upright tubular receptacled member at the center of the pedestal is a tubular arm extending around in a substantially semi-circular fashion and against which an operator may push in order to move the pedestal on its wheels or rest in pulling the camera in order to make smoother the actual movement, the pedestal being of a type which is particularly adaptable for the support of motion picture cameras, television cameras, etc., so that mobility plays an important part.

Referring to Fig. 1, the radial arm members 10 are joined to an upright housing 11 which is tubularly hollowed at its center portion, fitting into the tubular opening is a hollow first or outer tubular member 12 and a second or inner hollow tubular member 13. The tubular members and receptacle are in this particular case cylindrically shaped, but it will be appreciated that their shape might be other than circular, such as rectangular, hexagonal, or the like. The two tubular members 12 and 13 form the telescopic elevating mechanism for the plate 20 to which the object to be supported by the pedestal is secured.

Spaced between the first and second tubular members 12 and 13 respectively is a hollow tube shaped member 14 which is joined at one extremity to a gear 15 and whose other extremity is supported in position between the two cylinders. This latter tubular member 14 is slotted, and inserted in the member is a keyed rod arm 16 which extends upwardly past the extremity of the first tubular telescopic elevating member 12 where it is joined to a lever arm 17. The gear 15 is placed in co-operative relationship to a driven gear 18 which is rigidly connected axially with one of the sprocket members 19. The sprocket members on each of the wheels are joined together by a sprocket chain, not shown in this figure, and the gear arrangement 15, 18, the hollow slotted tube 14 and the keyed rod arm 16 and lever arm 17 from the steering mechanism to guide the pedestal during mobility.

As has been stated hereinbefore, the object to be supported, which in this case is assumed to be a television camera, is secured to a supporting plate member 20. This plate member contains apertures into which may fit pins from a mounting plate on the bottom of the camera, or the camera mounting plate may have recesses which may fit into a number of pin members 36 of which one is shown here. The plate member 20 is secured to a supporting member 37 which forms a part of the so-called panning means or traversing means for the camera. These traversing means are supported on a bearing surface 38 which is joined to the inner tubular member 13 and on which the camera may traverse.

Also joined to the supporting plate 20 is a housing member 39, a part of which is in co-operative relationship with a bearing 40, the axis of the bearing being located at right angles to the major axis of the pedestal. This arrangement forms the tilting arrangement for the camera. Inside the housing 39 is a resilient member 41, which in one form may be a spring member of a high torsional constant. One end of the spring is joined fixedly to one section of the bearing plate 85 and the other end of the spring is joined to a crank lever 42. The end of this crank lever is joined to a screw arrangement 43 and thus by means of changing the position of the screw arrangement 43, the crank rotates for a limited number of degrees. The "zero position" of the resilient spring member 41 which acts as a counter-balancing spring is thus changed. The camera may be locked in any position of tilt by means of a take-up knurled headed screw and spring arrangement such as the panning lock 44 which then obviously will lock the member 45, a part of the tilting system, from further rotation or the member 86 of Fig. 2 which is the locking arrangement used, comprising a feed-in locking screw member.

The object of having an adjustable counter-balancing spring, such as illustrated at 41, is to provide for counterbalancing additional weights such as the extra telescopic lenses which are ofttimes desirable for use with the television camera. With such an arrangement, the initial position of the spring may be so fixed that for all positions of tilting of the camera, a perfect counter-balance is obtained despite the comparatively large weight involved.

Between bearing members 85 and 38 and also between the surfaces comprising the tilting bearing, it has been customary to use a bearing grease whose viscosity is very high, so that the force necessary to cause motion of the bearing increases with the velocity of the motion. The grease has been formed of a combination of a viscous grease and a resin, and if the camera is traversed slowly, the restraining force is low, whereas if an attempt is made to traverse the camera quickly the restraining force is very high. This allows an "even" traversing of the camera. The keys on the outer surfaces of the two telescoping tubular members are shown in this view as 47 and 48. The relative position of tubular members 12 and 13 is clearly shown in this diagram. The location of the slotted tubular member 14 forming a part of the steering mechanism and the keyed arm 16 is also shown. The winding form 31 is shown in its relative position to the rest of the upright section of the pedestal.

Referring to Fig. 2, there is shown a perspective view of the pedestal in a bold arrangement and a perspective of the camera which it is adapted to support as a phantom arrangement in order to give a complete view of the entire arrangement.

What is claimed is:

In a mobile pedestal structure for television cameras wherein the camera to be supported is secured to a supporting member carried by said pedestal, a bearing member fixed to said supporting pedestal and adapted to support said supporting member, tilting means co-operatively associated with said bearing member, means for raising and lowering said pedestal, means for tilting and moving said camera to be supported comprising a pair of handle bar members, at least one of which acts as a control member for energizing said raising and lowering means for raising and lowering the pedestal with respect to its base.

ALDA V. BEDFORD.
KNUT J. MAGNUSSON.